United States Patent Office 3,404,757
Patented Oct. 8, 1968

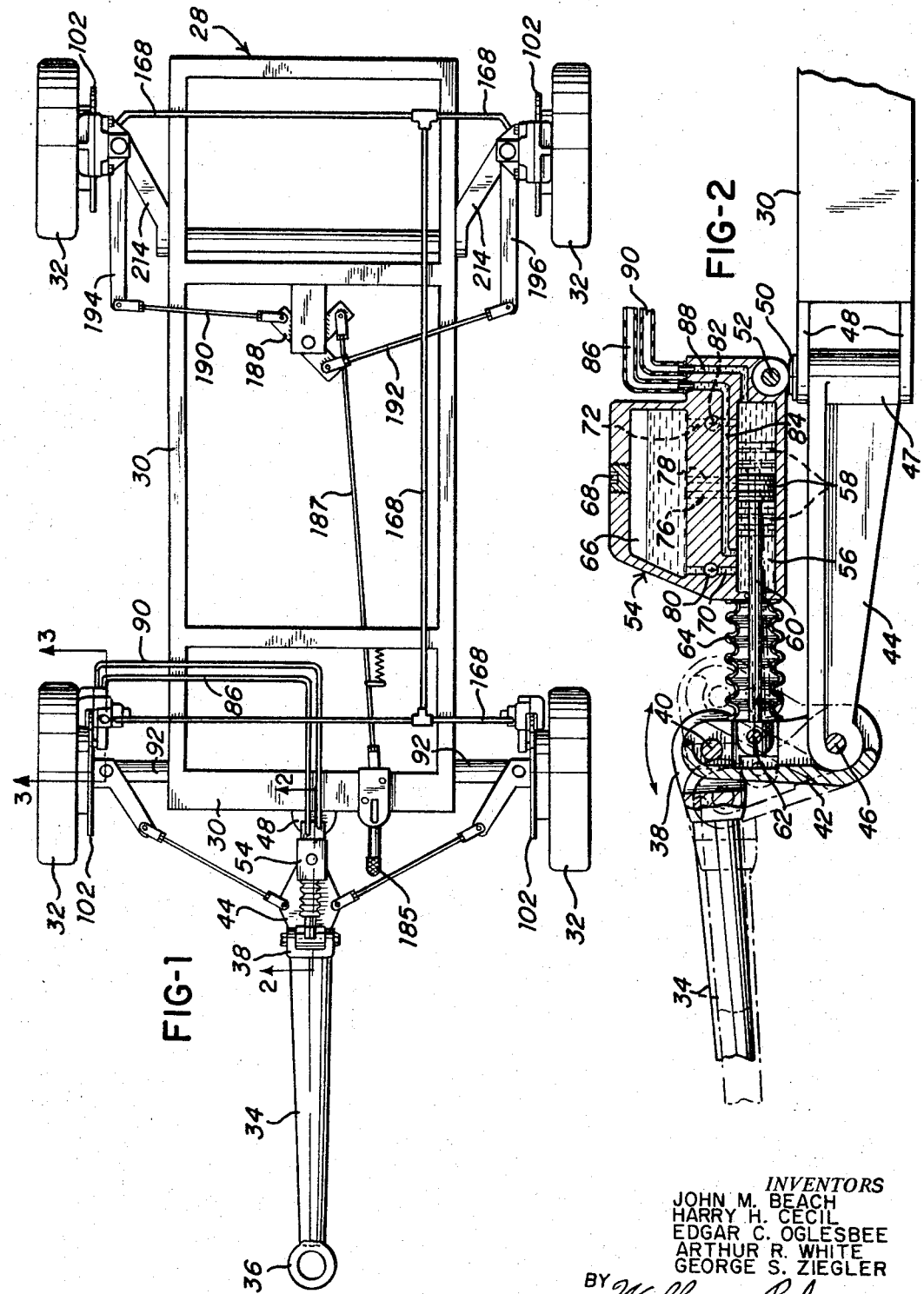

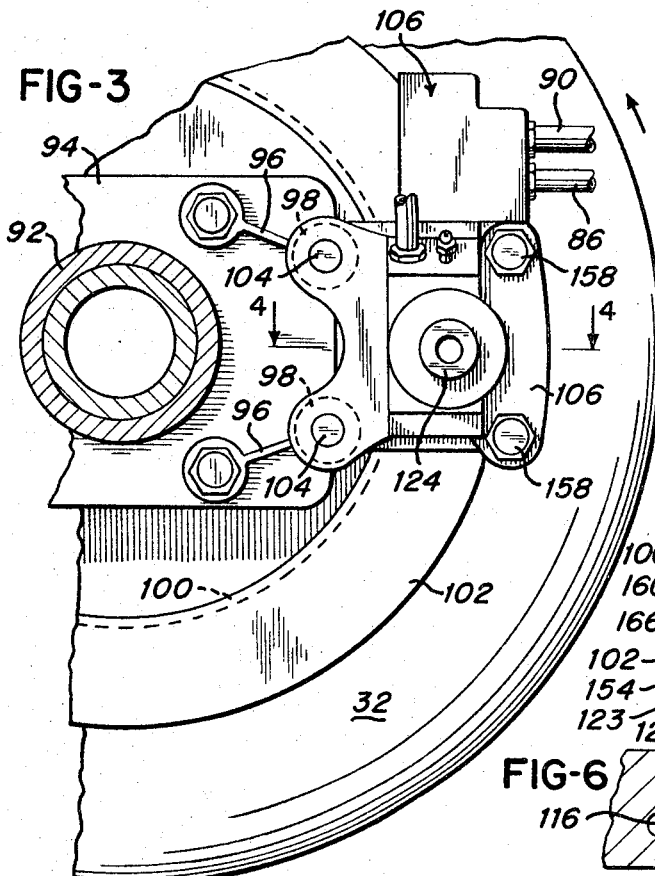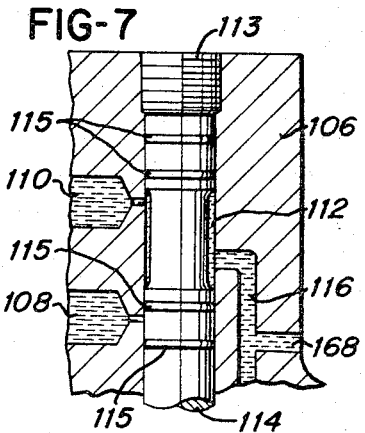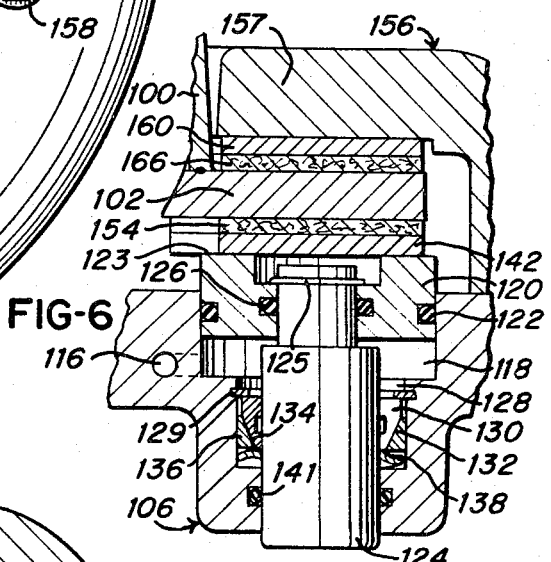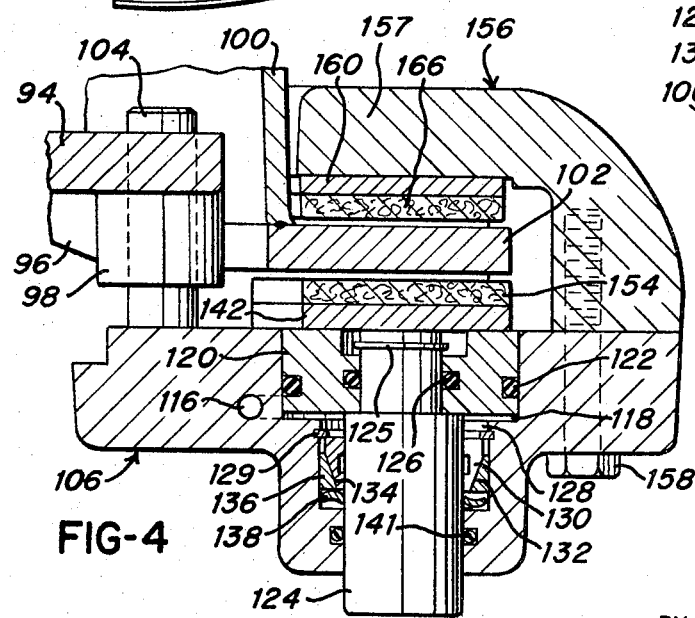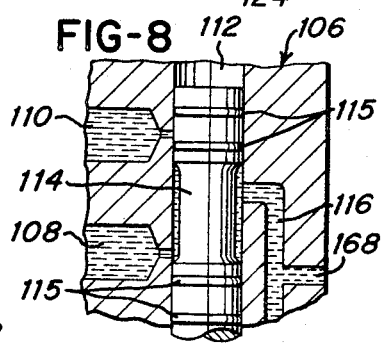

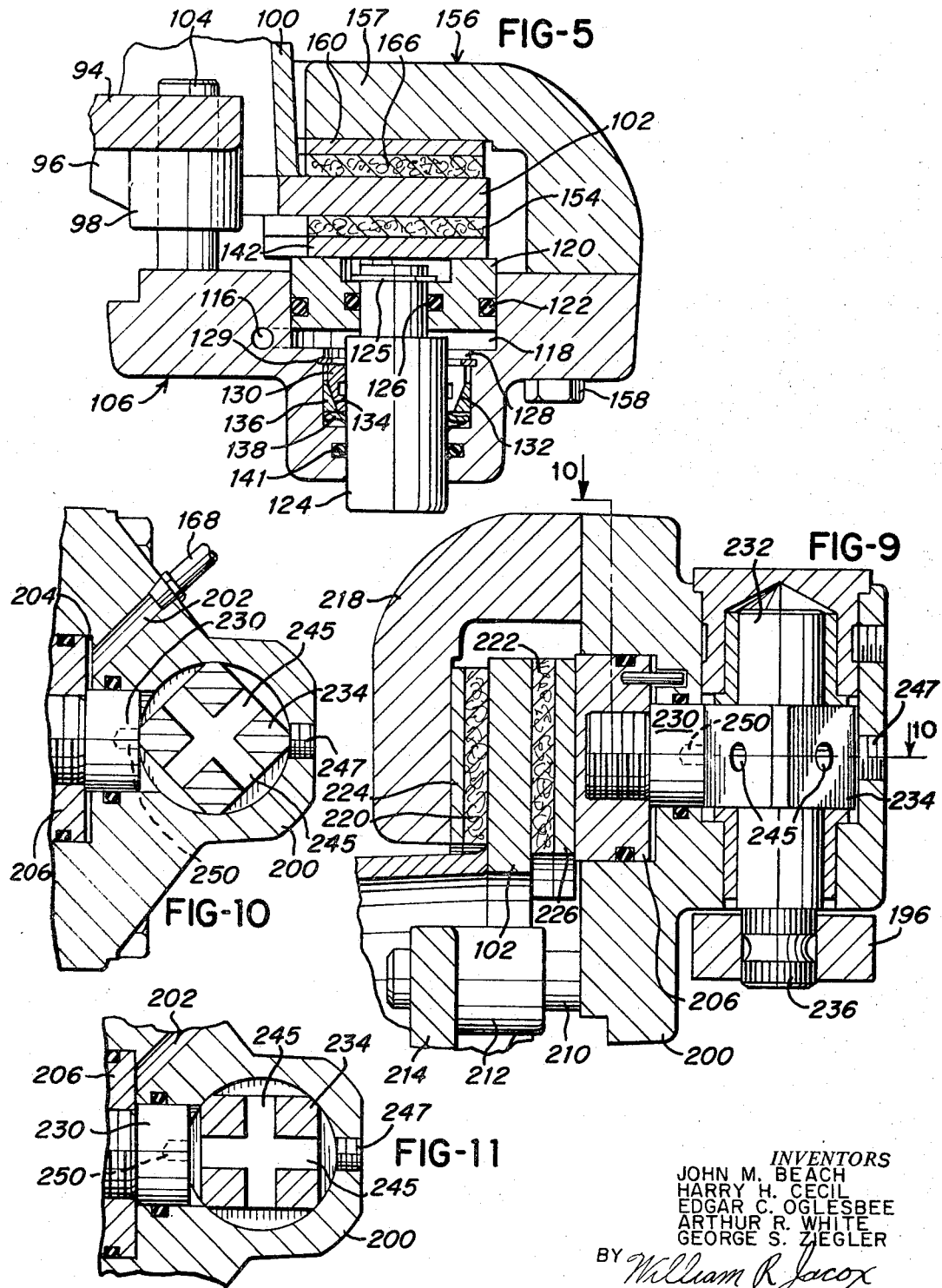

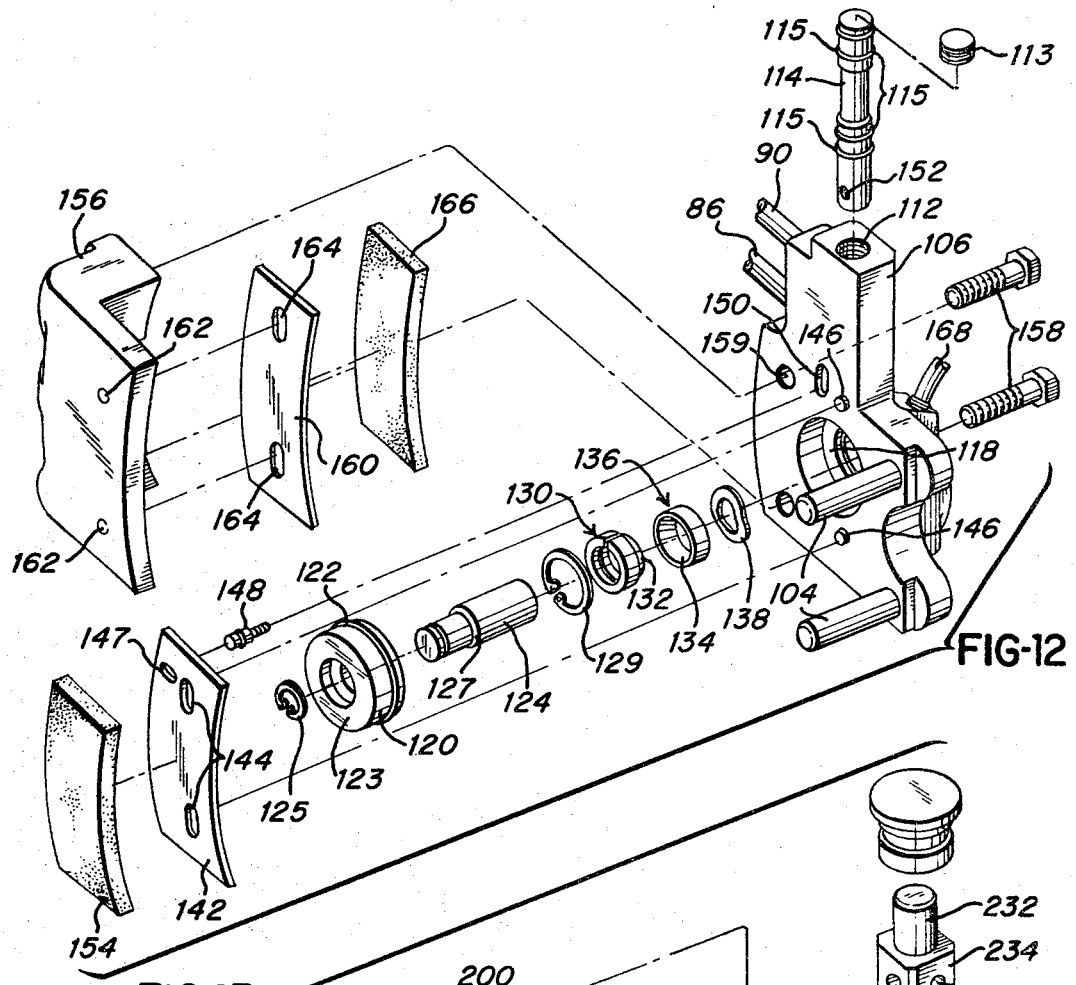

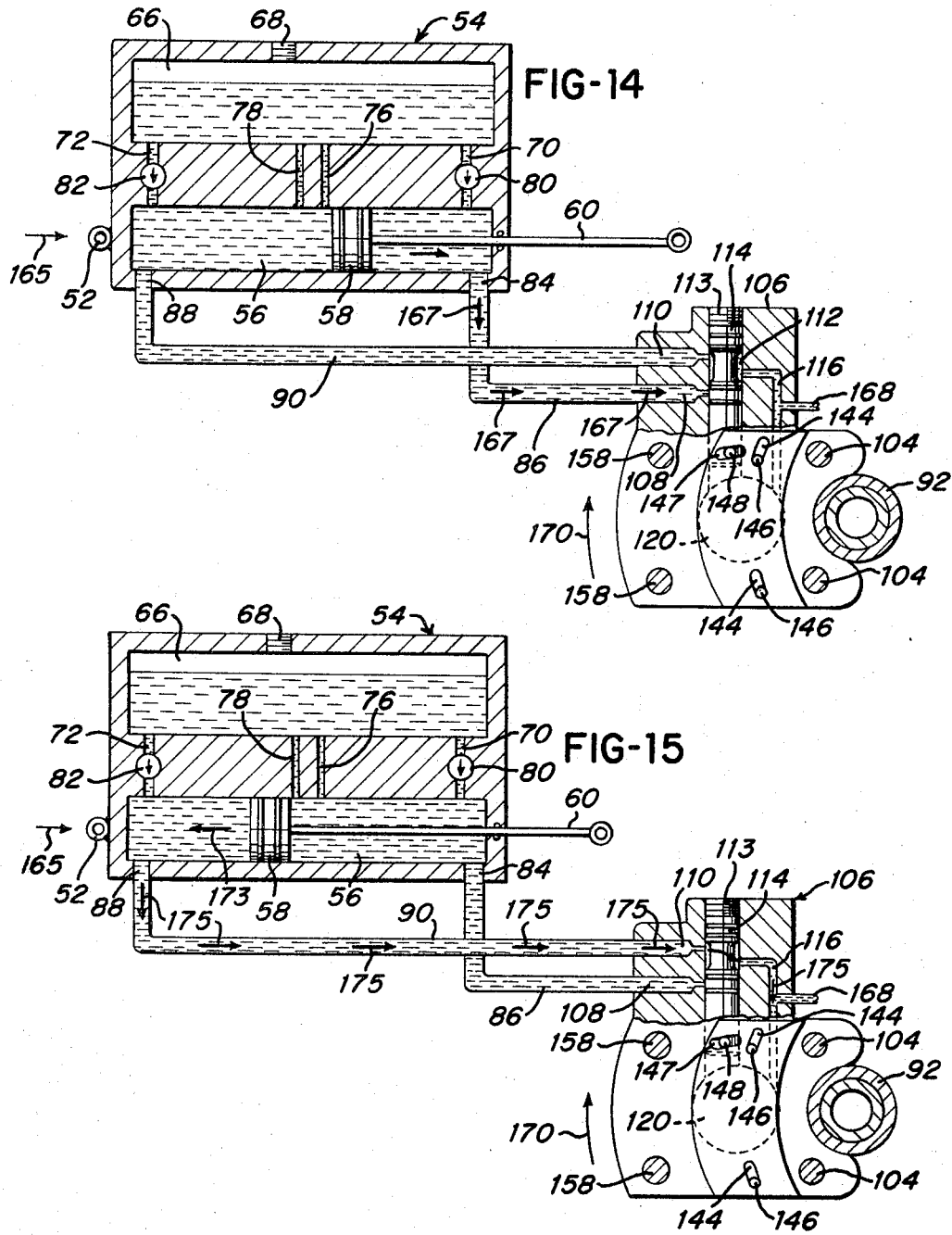

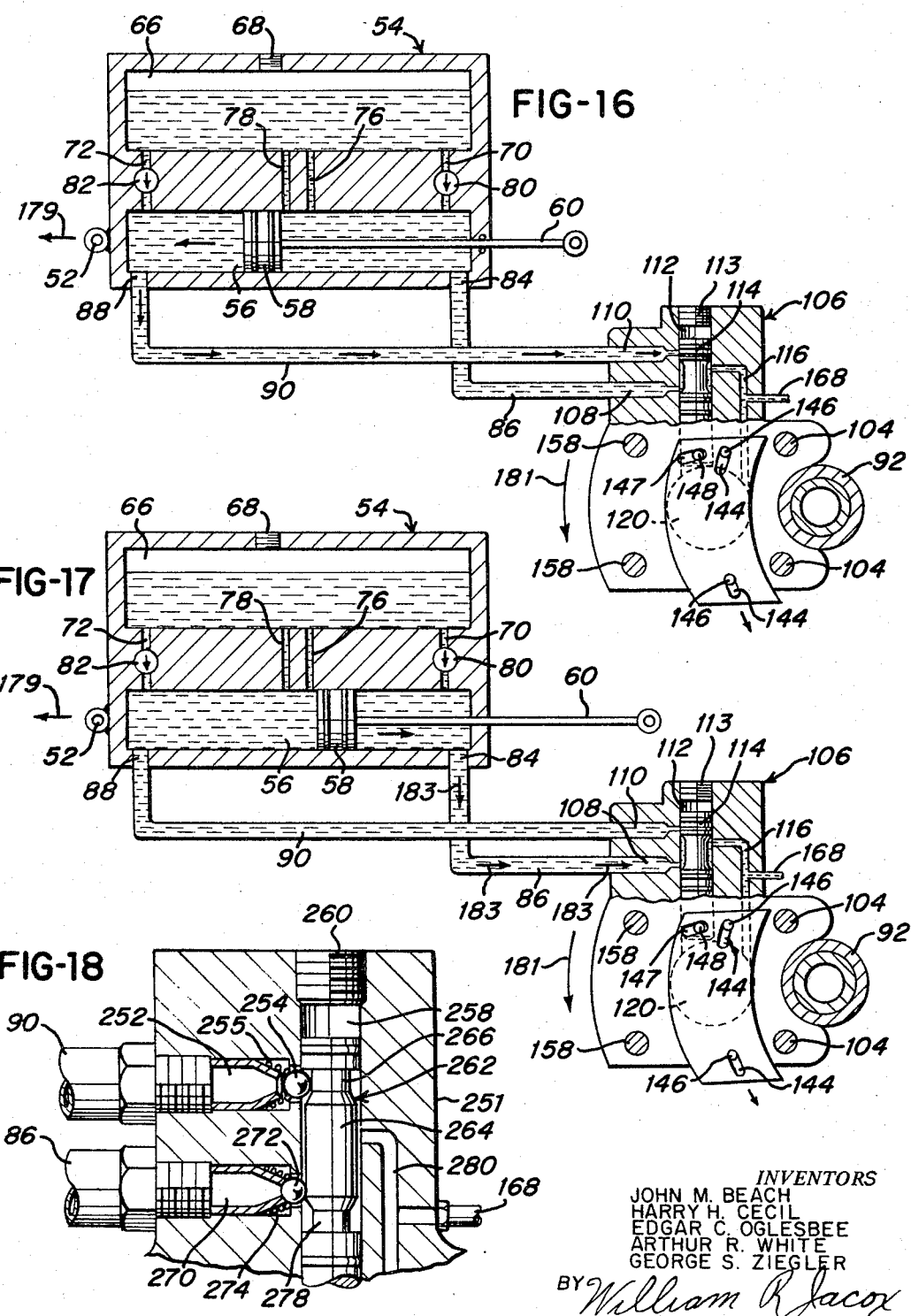

3,404,757
AUTOMATICALLY OPERABLE BRAKE APPARATUS FOR TRAILER VEHICLE
John M. Beach, Dayton, Harry H. Cecil, Brookville, Edgar C. Oglesbee and Arthur R. White, Dayton, and George S. Ziegler, Miamisburg, Ohio, assignors to J. M. Beach Manufacturing, Inc., Dayton, Ohio, a corporation of Ohio
Continuation of abandoned application Ser. No. 416,996, Dec. 9, 1964. This application Apr. 7, 1967, Ser. No. 636,231
20 Claims. (Cl. 188—112)

ABSTRACT OF THE DISCLOSURE

The invention relates still more particularly to automatically operable trailer brake apparatus in which only a hitch connection is required betwen the trailer vehicle and a tow vehicle for proper operation of the brake mechanism of the trailer vehicle.

---

This application is a continuation of Ser. No. 416,996, filed Dec. 9, 1964, now abandoned.

This invention relates to vehicle apparatus. The invention relates more particularly to trailer vehicle apparatus. This invention relates still more particularly to towing and braking apparatus for trailer vehicles.

Background of the invention

In the past, numerous types of apparatus have been created by which trailer hitch apparatus has included means for automatically braking the trailer vehicle. However, such trailer hitch apparatus has included means for braking the trailer vehicle only when the trailer vehicle is being towed in a forward direction by a tow vehicle. In the past, during pushing operation upon a trailer vehicle in a reverse direction, there has been no braking means carried by the trailer for stopping the trailer vehicle or for decreasing the rate of movement thereof. Some apparatus has provided braking operation in reverse movement of a trailer vehicle through interconnections between the brake mechanism of the tow vehicle and the brake mechanism of the trailer vehicle. However, such interconnections are objectionable.

It is highly desirable to have hitch and brake means by which a trailer vehicle is automatically braked in either direction of movement. Simplification and ease in attachment of the trailer vehicle to the tow vehicle is desirable. The size of the tow vehicle in consideration of the size and load of the trailer vehicle can be much smaller if the trailer vehicle has brake apparatus by which the trailer vehicle is automatically braked in both forward and reverse directions of movement. Furthermore, complete safety of operation requires braking operation of a trailer vehicle in any direction of movement of the trailer vehicle.

It is an object of this invention to provide trailer hitch and brake apparatus which includes means for automatically braking wheel structure of a trailer vehicle when the trailer vehicle is being pulled by a tow vehicle and when the trailer vehicle is being pushed in a reverse direction by the tow vehicle.

It is another object of this invention to provide brake apparatus by which hydraulic and mechanical operator means are combined in a single brake unit.

It is another object of this invention to provide automatic brake adjustment mechanism.

Other objects and advantages reside in the construction of parts, the combination thereof, the method of manufacture, and the mode of operation, as will become more apparent from the following description.

In the drawings:
FIGURE 1 is a top plan view of a trailer frame and wheel structure with which tow and brake apparatus of this invention is combined.
FIGURE 2 is an enlarged fragmentary sectional view taken substantially on line 2—2 of FIGURE 1.
FIGURE 3 is an enlarged fragmentary sectional view taken substantially on line 3—3 of FIGURE 1.
FIGURE 4 is an enlarged fragmentary sectional view taken substantially on line 4—4 of FIGURE 3.
FIGURE 5 is an enlarged fragmentary sectional view similar to FIGURE 4 but showing elements of the apparatus in a position of operation.
FIGURE 6 is an enlarged fragmentary sectional view similar to FIGURES 4 and 5 but showing elements of the apparatus in another position of operation.
FIGURE 7 is a fragmentary sectional view showing a portion of the brake control apparatus of this invention.
FIGURE 8 is a fragmentary sectional view similar to FIGURE 7 but showing the elements of the apparatus in another position of operation.
FIGURE 9 is a sectional view showing wheel structure brake apparatus which is operable by fluid or by mechanical means.
FIGURE 10 is a fragmentary sectional view taken substantially on line 10—10 of FIGURE 9.
FIGURE 11 is a fragmentary sectional view similar to FIGURE 10 and showing a portion of the apparatus of FIGURE 10 in another position of operation.
FIGURE 12 is an exploded perspective view of the apparatus shown in FIGURES 4 and 5.
FIGURE 13 is an exploded perspective view of the apparatus of FIGURES 9, 10 and 11.
FIGURE 14 is a diagrammatic type of view with parts shown in section of the hitch and brake apparatus of this invention.
FIGURE 15 is a diagrammatic type of view, similar to FIGURE 14, showing elements of the hitch and brake apparatus in another position of operation.
FIGURE 16 is a diagrammatic type of view, similar to FIGURES 14 and 15, showing elements of the hitch and brake apparatus in another position of operation.
FIGURE 17 is a diagrammatic type of view, similar to FIGURES 14, 15, and 16 showing elements of the hitch and brake apparatus in another position of operation.
FIGURE 18 is a fragmentary sectional view of a modification of the apparatus of FIGURES 7 and 8.

Referring to the drawings in detail, FIGURE 1 illustrates a trailer vehicle 28 provided with a frame 30, having wheel structures 32 and a tow bar 34. The tow bar 34 has an end portion 36 which is adapted to be connected to a tow vehicle (not shown) of any suitable type. The tow bar 34 is adapted to be in a generally horizontal position, as shown in FIGURE 2, when joined to a tow vehicle. The tow bar 34 has an opposite end portion 38 which is pivotally connected by means of a pin 40, to one end of a yoke or lever 42, as shown in FIGURE 2. The yoke 42 is adapted to be normally in a generally vertical position as it extends downwardly from the tow bar 34. The opposite or lower end of the yoke 42 is pivotally joined to a turning plate 44 by means of a pin 46.

The turning plate 44 has a rearward portion 47 which is pivotally joined to a bracket 48 which is carried by the forward part of the frame 30. Any suitable means such as a connector 50 is supported by the bracket 48 for rotative movement about the axis of pivotal movement of the turning plate 44. Pivotally attached to the connector 50 by means of a horizontally disposed pin 52 is a housing 54. Thus, the housing 54 is pivotally movable about a vertical axis with pivotal movement of the plate 44 and the housing 54 is pivotally movable about a horizontal axis established by the pin 52.

The housing 54 has an elongate cavity portion or member 56 and a reservoir portion or member 66. Within the cavity portion 56 is an axially movable piston 58. The reservoir 66 and the cavity 56 may be within separate housing structures, rather than within a single housing structure.

A piston rod 60 is attached to the piston 58 and extends from the housing 54 and is pivotally joined to the yoke 42 intermediate the ends thereof by a pin 62.

A flexible cover member 64 is shown in covering relation to the rod 60.

The reservoir portion 66 contains a fluid such as an oil or the like. A plug 68 in the upper part of the housing 54 is removable for communication with the reservoir 66. A passage or conduit 70 in the housing 54 joins the reservoir 66 to the elongate cavity 56 adjacent the forward end thereof. A passage or conduit 72 joins the reservoir 66 to the elongate cavity 56 adjacent the rearward end thereof. Spaced-apart passages or conduits 76 and 78 join the reservoir 66 to the cavity 56 at positions intermediate the passages 70 and 72.

A check-valve 80 is disposed within the passage 70 and permits flow of fluid therethrough only in a direction from the reservoir 66 to the cavity 56. A check-valve 82 is disposed within the passage 72 and permits flow of fluid therethrough only in a direction from the reservoir 66 to the cavity 56.

A passage 84 is also formed within the housing 54 and has an end in communication with the cavity 56 adjacent the forward end thereof. The other end of the passage 84 is joined to a fluid conduit 86 which is connected to the housing 54. A passage 88 is also formed within the housing 54 and communicates with the cavity 56 adjacent the rearward end thereof. A fluid conduit 90 is joined to the housing 54 in communication with the passage 88.

As shown in FIGURE 1, the fluid conduits 86 and 90 extend from the housing 54 to one of the wheel structures 32 of the trailer vehicle 28. Herein the conduits 86 and 90 are shown extending to the right front wheel structure 32 of the trailer vehicle 28.

The front wheel structures 32 of the trailer vehicle 28 are rotatably supported upon suitable bearing means, not shown, at opposite ends of a non-rotatable axle 92, as shown in FIGURES 1 and 3. A support plate 94 is firmly attached to each end of the axle 92, substantially normal thereto. The support plate 94 which is associated with the right front wheel structure 32 is shown in FIGURE 3.

A plurality of ribs 96 is carried by the plate 94. Each of the ribs 96 has attached thereto, integrally or otherwise, a sleeve 98, illustrated in FIGURES 3, 4, and 5. An axially extending flange 100 is attached to each wheel structure 32 for rotation therewith and has an annular brake disc 102 rigidly attached thereto. The brake disc 102 is substantially normal to the axis of rotation of the wheel structure 32 by which it is carried. The brake disc 102 is used for braking the wheel structure 32 of which the brake disc 102 is a part.

A stud 104, shown in FIGURES 4, 5, 6, and 12, slidably extends through each of the sleeves 98. Therefore, due to the fact that each support plate 94 carries two of the sleeves 98, there are two studs 104 axially movably carried by each of the plates 94, as each stud 104 is slidably axially movable within its respective sleeve 98. Firmly attached to the pair of studs 104 is a housing 106, shown in FIGURES 3, 4, 5, 6, and 12. Thus, the housing 106 is carried by the studs 104 and the housing 106 is disposed adjacent one surface of the disc 102 and the housing 106 is movable toward and away from the disc 102 as the studs 104 axially move within the sleeves 98.

The fluid conduits 86 and 90 are joined to the housing 106, as shown in FIGURES 3 and 12 and as illustrated in FIGURES 14, 15, 16, and 17. Within the housing 106 there is a passage 108 which communicates with the conduit 86 and a passage 110 which communicates with the passage 90, as illustrated in FIGURES 14, 15, 16, and 17.

The passages 108 and 110 extend within the housing 106 to an elongate bore 112. The bore 112 is closed at one end thereof by a plug 113, as shown in FIGURES 7, 12, 14, 15, 16, and 17. Axially movable within the bore 112 is an elongate valve 114. Sealing ring members 115 encompass the valve 114 and engage the walls of the bore 112.

Also, in communication with the bore 112 is a passage 116. The passage 116 extends within the housing 106 to a cavity 118, as shown in FIGURES 4, 5, and 6. Within the cavity 118 is fluid motor means in the form of a piston 120 which has an encompassing annular sealing member 122 in engagement with the wall of the cavity 118. The piston 120 is axially movable within the cavity 118. For a purpose discussed below, the piston 120 has an end surface 123, shown in FIGURE 12, which is provided with any suitable anti-friction material, such as Teflon or the like.

A stem 124 extends through the piston 120 and is slidably axially movable with respect thereto. A snap ring 125 is secured to the stem 124 adjacent the end thereof and retains the piston 120 upon the stem 124 as the piston 120 is axially movable between the snap ring 125 and a shoulder 127 of the stem 124. A sealing ring 126 encompasses the stem 124 and engages the central portion of the piston 120. The stem 124 is axially movable with respect to the housing 106.

The stem 124 extends into a recess 128. Encompassing the stem 124 within the recess 128 and spaced from the stem 124 is a snap ring 129 which is partially disposed within the wall of the recess 128. A split lock ring 130 snugly encompasses the stem 124 and has a tapered outer surface 132 which engages a tapered inner surface 134 of a collar 136, as shown in FIGURES 4, 5, 6, and 12. A resilient washer 138 encompasses the stem 124 in engagement with the end wall of the recess 128 and engages the collar 136 and urges the collar 136 toward the split ring 130. A sealing ring 141, partially disposed within a wall of the recess 128, is also shown encompassing the stem 124 in engagement therewith.

A brake shoe or carrier plate 142 is disposed intermediate the piston 120 and the disc 102. As shown in FIGURES 12, 14, 15, 16, and 17, the carrier plate 142 is provided with a pair of elongate slots 144. A protuberance or lug 146, carried by the housing 106, extends through each slot 144 and retains the carrier plate 142 for limited longitudinal movement with respect to the housing 106. The carrier plate 142 also has a slot 147, through which extends a peg 148. The peg 148 extends through a slot 150 in the housing 106, as shown in FIGURE 12, and is threadedly attached to the valve 114 within a hole 152 therein adjacent the end thereof. Therefore, longitudinal movement of the carrier plate 142 causes axial movement of the valve 114.

A brake pad or engagement member 154 is attached to the carrier plate 142 by any suitable means, such as by adhesive means or by rivets, or the like. Thus, the brake pad 154 is adjacent the disc 102 and is engageable therewith.

An arm 156, shown in FIGURES 4, 5, and 12, is attached to the housing 106 by a pair of bolts 158, each of which extends through an opening 159 in the housing 106 and is threaded into the arm 156, as illustrated in FIGURE 12.

The arm 156 has a back portion 157 thereof adjacent the surface of the disc 102 opposite the housing 106. A carrier plate 160 is disposed adjacent the arm 156 and is carried thereby by means of pegs 162, each of which is attached to the back portion 157 of the arm 156 and extends into an elongate slot 164 of the carrier plate 160, as illustrated in FIGURE 12. Thus, the carrier plate 160 has limited longitudinal movement with respect to the arm 156. The surface of the carrier plate 160 and/or the surface of the back portion 157 of the arm 156 which is engaged by the carrier plate 160 is provided with suitable anti-friction material.

A brake pad or engagement member 166 is attached to the carrier plate 160 by any suitable means, such as by adhesive means or by rivets or the like. Thus, as shown in FIGURES 4, 5, and 6, the brake pad 166 is adjacent one side surface of the disc 102 and the brake pad 154 is adjacent the opposite side surface of the disc 102.

As shown in FIGURES 7, 8, 14, 15, 16, and 17, the passage 116 also has a portion which extends outwardly within the housing 106 and communicates with a conduit 168 which is attached to the housing 106. The conduit 168 is also shown in FIGURE 1 as it extends to the brake apparatus associated with the other wheel structures 32 of the trailer vehicle 28.

Operation

As stated above, the end portion 36 of the tow bar 34 is adapted to be connected to a tow vehicle. This is the only connection which is required between a tow vehicle and a trailer vehicle which is provided with hitch and brake apparatus of this invention.

As shown in FIGURE 2, the tow bar 34 is joined to the yoke 42, and the piston rod 60 is joined to the yoke 42. Therefore, when a tow vehicle which is connected to the tow bar 34 moves forwardly to pull the trailer vehicle 28, the tow bar 34 moves forwardly with the tow vehicle. When the tow bar 34 is moved forwardly, which is to the left, as shown in FIGURES 1 and 2, the yoke 42 is moved to an angularly inclined forward position, as shown in broken lines in FIGURE 2. When the yoke 42 moves forwardly to an angularly inclined position, the yoke 42 pulls the piston rod 60 forwardly and moves the piston 58 forwardly within the cavity 56. Due to the fact that the piston rod 60 is operated by the tow bar 34 through the yoke 42, a mechanical advantage and a high degree of sensitivity is obtained in the operation of the piston rod 60. As the yoke 42 moves angularly, there is slight pivotal action of the housing 54 about the pin 52.

Forward movement of the trailer vehicle 28 is illustrated diagrammatically in FIGURE 14. As viewed in FIGURE 14, forward movement is toward the right as illustrated by an arrow 165. The piston rod 60 is pulled to the right, as shown in FIGURE 14, by the two bar 34 and the yoke 42. Thus, when a tow vehicle pulls the trailer vehicle 28, the piston 58 is moved to the right within the cavity 56, as shown in FIGURE 14.

The cavity 56 and the conduits 86, 90, and 168 are filled with fluid which has moved thereto from the reservoir 66. Thus, when the piston 58 moves toward the right within the cavity 56, as shown in FIGURE 14, the piston 58 applies pressure to the fluid within the cavity 56 which is to the right of the piston 58. As shown, the piston 58 has moved to the right of the passages 76 and 78 within the housing 54. Thus, the pressure of fluid within the cavity 56 to the right of the piston 58 also exists within the passage 70. However, the check-valve 80 within the passage 70 permits flow of fluid in the passage 70 in a direction only from the reservoir 66 to the cavity 56. Thus, fluid pressure created by the piston 58 within the cavity 56 is transmitted to the fluid within the conduit 86, as illustrated by arrows 167 in FIGURE 14.

The fluid passages or conduits 76 and 78 which extend between the reservoir 66 and the cavity 56 permit flow of fluid therebetween with movement of the piston 58 within the cavity 56.

As stated above, and as shown in the drawings, the fluid conduit 86 extends from the housing 54, which is adjacent the tow bar 34, to the housing 106 which is adjacent the right front wheel structure 32 of the trailer vehicle 28. The conduit 86 communicates with the passage 108 within the housing 106.

As stated above, longitudinal movement of the carrier plate 142 causes axial movement of the valve 114. For a reason discussed below, when the front right wheel structure 32 of the trailer vehicle 28 is rotating in a forward direction, as illustrated by an arrow 170 in FIGURE 14, the carrier plate 142 is positioned as shown in FIGURE 14, i.e., moved to its extreme clockwise position, as viewed in FIGURE 14. Clockwise movement of the carrier plate 142, as shown in FIGURE 14, is limited by the lugs 146 which extend through the slots 144 of the carrier plate 142. When the carrier plate 142 is in its extreme clockwise position, as shown in FIGURE 14, the valve 114 is moved to its extreme position toward the plug 113. Such longitudinal movement of the valve 114 with movement of the carrier plate 142 results from the connection of the peg 148 to the valve 114 as the peg 148 is also positioned within the slot 147 of the carrier plate 142.

When the valve 114 is at its extreme position toward the plug 113, as shown in FIGURES 7 and 14, the end of the passage 108 within the housing 106 is closed and fluid cannot enter the bore 112 from the passage 108. Therefore, fluid within the passage 108 which is under pressure caused by the force of the piston 58 cannot flow. Therefore, the fluid which is within the cavity 56 at the right of the piston 58 within the housing 54 and within the conduit 86 and within the passage 108 of the housing 106 is under static pressure. The static pressure is in direct relationship to the forces exerted by the tow bar 34 as the tow bar 34 tows the trailer vehicle 28 as the tow 34 is connected through the yoke 42 to the piston rod 60.

When the tow vehicle which is pulling the trailer vehicle 28 decreases its rate of travel, the energy stored in the trailer vehicle 28 tends to cause the trailer vehicle 28 to continue its rate of movement. Therefore, the trailer vehicle 28 tends to decrease the distance between the trailer vehicle 28 and the tow vehicle. Thus, the tow bar 34 is moved toward the trailer vehicle 28 as the yoke 42 pivotally moves to a rearwardly inclined position as shown in FIGURE 2, as the trailer vehicle 28 continues to move forwardly as illustrated by the arrow 165 in FIGURE 15. Thus, there is relative movement between the housing 54 which is attached to the trailer vehicle 28 and the piston 58 within the cavity 56 of the housing 54. Thus, the piston 58 becomes disposed with respect to the housing 54 in a manner similar to that illustrated in FIGURE 15. Thus, the piston 58 becomes disposed rearwardly of the centrally located passages 78 and 76 within the housing 54. Thus, the piston 58 applies pressure on the fluid at the rearward portion of the cavity 56 as illustrated by an arrow 173 in FIGURE 15. Due to the fact that the passage 72 has the check-valve 82 therein, fluid cannot flow through the passage 72 in a direction from the cavity 56 to the reservoir 66. Therefore, pressure is applied to the fluid within the conduit 90 which extends from the housing 54 to the housing 106, as illustrated by arrows 175 in FIGURE 15.

Due to the fact that the right front wheel structure 32 with which the carrier plate 142 is associated is rotating in a forward direction, as illustrated by the arrow 170 in FIGURE 15, the valve 114 remains in its extreme position toward the plug 113, as shown in FIGURE 15. With the valve 114 positioned as shown in FIGURE 15, fluid can flow from the passage 110 into the bore 112, and from the bore 112 fluid flows into the passage 116 within the housing 106. As stated above, the passage 116 communicates with the cavity 118 as illustrated in FIGURE 4. Thus, the fluid pressure is applied to the piston 120 within the cavity 118 so that fluid pressure within the cavity 118 causes relative movement between the piston 120 and the housing 106. Thus, the piston 120 moves axially from the position thereof shown in FIGURE 4 to the position thereof shown in FIGURE 5. The piston 120 thus forces the carrier plate 142 toward the disc 102 and thus the brake pad 154 engages the disc 102.

As fluid pressure occurs within the cavity 118, the housing 106 is caused to move in a direction away from the disc 102 as the housing 106 is carried by the studs 104 which are slidably movable within the sleeves 98. Due to the fact that the arm 156 is attached to the housing 106, the back portion 157 of the arm 156 moves the carrier plate 160 toward the disc 102 and thus moves the brake pad 166 into engagement with the disc 102 at the opposite side surface thereof from that engaged by the brake pad 154, as shown in FIGURE 5. Thus, fluid pressure created within the cavity 56 of the housing 54 by the piston 58 creates pressure within the cavity 118, and fluid pressure within the cavity 118 provides forces which urge the brake pads 154 and 166 toward opposite surfaces of the brake disc 102.

As stated above, the passage 116 in the housing 106 is also in communication with the conduit 168 which extends to all of the other wheel structures 32 of the trailer vehicle 28. Therefore, fluid pressure is applied simultaneously to the brake apparatus associated with all of the wheel structures 32 of the trailer vehicle 28.

The amount of the fluid pressure applied to the brake apparatus of the wheel structures 32 of the trailer vehicle 28 is dependent upon the relative forces exerted between the trailer vehicle 28 and its tow vehicle. Such relative forces, of course, depend primarily upon the movement of the tow vehicle relative to the movement of the trailer vehicle 28. If the tow vehicle comes to a complete stop, the braking apparatus automatically operates, as discussed above, to apply pressure to the disc 102 of each wheel structure 32 to completely stop rotation thereof.

If after the trailer vehicle 28 is stopped, it is decided to have the tow vehicle push the trailer vehicle 28 in a reverse direction, the tow bar 34 is again urged to move rearwardly so that the yoke 42 is angularly rearwardly inclined, as illustrated in FIGURE 2, and the piston rod 60 and the piston 58 are urged rearwardly to substantially the positions thereof shown in FIGURE 15. Thus, fluid pressure is again applied by the piston 58 to the conduit 90, as illustrated by arrows 175 in FIGURE 15. Due to the fact that the trailer vehicle 28 stopped with the carrier plate 142 in the position shown in FIGURE 15, the carrier plate 142 is in the position shown in FIGURE 15 when the tow vehicle begins to push the trailer vehicle 28 rearwardly. Thus, the valve 114 is in the position thereof shown in FIGURE 15 when the tow vehicle begins to push the trailer vehicle 28 rearwardly. Therefore, when the pushing action upon the trailer vehicle 28 begins to occur, fluid is forced through the passage 116 in the housing 106 to the cavity 118 and causes braking action to be applied to the disc 102 of each wheel structure 32 as discussed above.

However, as discussed above, the brake pad 166 is carried by the carrier plate 160 and the brake pad 154 is carried by the carrier plate 142. The slots 164 in the carrier plate 160 and the slots 144 in the carrier plate 142 permit limited longitudinal movement of the carrier plates 160 and 142.

As stated above, the surface 123 of the piston 120 is provided with anti-friction material and the surface of the back portion 157 of the arm 156 is provided with antifriction material. Therefore, the carrier plates 142 and 160 are permitted to move while braking pressure is applied thereupon by the piston 120. The other wheel structures 32 of the trailer vehicle 28 are also provided with carrier plates similar to the plates 142 and 160 which are longitudinally movable through a limited distance.

Therefore, as the tow vehicle urges the trailer vehicle 28 in a reverse direction, the wheel structures 32 are permitted to rotate slightly in a reverse direction as the carrier plates 160 and 142 are permitted by the slots 164 and 144 therein to move through a limited distance with rotative movement of the wheel structure 32. Thus, even though braking forces are applied to the brake disc 102 of each wheel structure 32 as the tow vehicle forces the trailer vehicle 28 rearwardly, as illustrated by arrows 179 and 181 in FIGURE 16, the wheel structures 32 move through a limited degree of rotation.

The reverse movement of the carrier plate 142 with reverse rotative movement of the disc 102 causes reverse movement of the valve 114. This is due to the fact that the valve 114 is connected to the carrier plate 142 through the peg 148 which is connected to the valve 114 and which is disposed within the slot 147 of the carrier plate 142. Thus, the carrier plate 142 moves from the position thereof shown in FIGURE 15 to the position thereof shown in FIGURE 16. Such movement of the carrier plate 142 is limited by the length of the slots 144 therein.

Such movement of the carrier plate 142 moves the valve 114 in a direction from the plug 113 to the position of the valve 114 shown in FIGURE 16. Such movement of the valve 114 is caused at the instant the trailer wheel structures 32 begin to rotate in a reverse direction. Immediately when the valve 114 moves to the position thereof shown in FIGURE 16, the valve 114 prevents a flow of fluid from the passage 110 to the passage 116. Therefore, fluid braking pressure upon the piston 120 through the passage 116 is instantaneously released and braking pressure upon the disc 102 through the brake pads 154 and 166 instantaneously ceases. Thus, the trailer wheel structures 32 freely rotate in a reverse direction, as illustrated by the arrow 181 in FIGURE 16, as the trailer vehicle 28 is pushed in a reverse direction by the two vehicle. During such reverse movement of the trailer vehicle 28, the fluid pressure conditions within the apparatus are as illustrated in FIGURE 16. Thus, there is no fluid braking pressure applied to the discs 102 of the wheel structures 32. The piston 58, however, applies a static pressure to the fluid within the left hand portion of the cavity 56 and to the fluid within the conduit 90, as illustrated in FIGURE 16.

When the tow vehicle reduces its rate of movement as the trailer vehicle 28 is being pushed in a reverse direction by the tow vehicle, relative movement between the piston rod 60 and the housing 54 results. Thus, the piston 58 moves toward the forward portion of the cavity 56, as shown in FIGURE 17, as the trailer vehicle 28 momentarily continues moving in a reverse direction at a rate faster than the tow vehicle. The direction of movement of the trailer vehicle 28 is illustrated by the arrow 179 in FIGURE 17.

When the piston 58 moves to a forward position within the cavity 56, the piston 58 causes a fluid pressure to be applied to the conduit 86. Thus, a fluid braking pressure is exerted through the conduit 86 and through the passage 108 and through the passage 116, as illustrated by arrows 183 in FIGURE 17. Thus, fluid pressure is applied to the piston 120 associated with the brake apparatus of each of the wheel structures 32. If the tow vehicle comes to a complete stop, a fluid pressure sufficient to completely stop rotation of the wheel structures 32 is applied automatically by the piston 58 to the brake discs 102 of the wheel structures 32.

Sufficient braking pressure is automatically applied to the brake discs 102 in accordance with the position of the tow vehicle with respect to the trailer vehicle 28. Therefore, it is understood that the apparatus of this invention automatically applies the proper braking forces to the wheel structures 32 in accordance with the movement of the tow vehicle with respect to the movement of the trailer vehicle 28, regardless of the direction of movement of the trailer vehicle 28.

Due to the fact that the trailer vehicle 28 is joined to a tow vehicle through the piston 58 and the fluid within the cavity 56, a "cushion" condition exists between a tow vehcile and the trailer vehicle 28 during movement of the trailer vehicle 28 by a tow vehicle.

The hitch mechanism as shown in FIGURES 1 and 2 "fails safe." If, for any reason, there should be a failure of any of the braking mechanism, the tow bar 34 continues to pull the trailer vehicle 28 through mechanism of the yoke 42 and the turning plate 44. Of course, under such a condition of failure, there would be no braking action but towing action can continue.

Automatic adjustment mechanism

FIGURE 4 shows the brake elements in completely released positions with the brake pads 154 and 166 out of engagement with the disc 102. FIGURE 5 shows the position of the piston 120 and the positions of the brake pads 154 and 166 when fluid pressure is applied thereto for braking the disc 102. After braking action has been completed, the fluid pressure within the cavity 118 is reduced or decreased to substantially zero. However, the brake pads 154 and 166 may remain in slight engagement with the disc 102 and thus are positioned substantially as shown in FIGURE 5. It is noted that when the piston 120 moves from the position thereof shown in FIGURE 4 to the position thereof shown in FIGURE 5, the piston 120 moves into engagement with the snap ring 125. The piston 120 continues to move toward the brake disc 102 until the brake pads 166 and 154 firmly engage the brake disc 102. Therefore, as the piston 120 engages the snap ring 125, the piston 120 draws the stem 124 toward the brake disc 102. Thus, the piston 120 determines the axial position of the stem 124 with respect to the housing 106. This axial position of the stem 124 is determined in accordance with the amount of relative movement between the piston 120 and the housing 106 necessary for engagement of the brake pads 154 and 166 with the brake disc 102.

Thus, as the brake pads 154 and 166 become worn and are reduced to a lesser thickness during continued use thereof, as shown in FIGURE 6, the piston 120 draws the stem 124 axially toward the disc 102 as the piston 120 engages the snap ring 125.

The stem 124 is prevented by the lock ring 130 and the collar 136 from axial movement in a direction away from the disc 102. Any movement of the stem 124 in a direction away from the disc 102 is prevented by operation of the resilient washer 138, the collar 136, and the lock ring 130. The spring washer 138 resiliently urges the collar 136 toward the lock ring 130 and the surface 134 of the collar 136 urges clamping action of the lock ring 130 upon the stem 124.

Thus, it is understood that the mechanism as shown in FIGURES 4, 5, and 6 includes automatically adjusting brake apparatus which automatically compensates for wear of the brake pads 166 and 154.

Parking brake apparatus

FIGURE 1 shows a handle 185 which is operable to axially move an elongate rod 187 which is pivotally attached to a crank member 188. Also attached to the crank member 188 is a link 190 and a link 192. The link 190 is pivotally connected to an arm 194. The link 192 is connected to an arm 196. The arm 194 is a part of the right rear wheel structure 32 and the arm 196 is a part of the left rear wheel structure 32. A portion of the arm 196 is shown in FIGURES 9 and 13.

FIGURES 9, 10, 11, and 13 show the brake apparatus of the left rear wheel structure 32. Braking fluid enters a housing 200 from the conduit 168, as illustrated in FIGURES 10 and 11. The conduit 168 communicates with a passage 202 within the housing 200. The passage 202 leads to a chamber 204 shown in FIGURES 9 and 10. Also, within the chamber 204 is a piston 206. A guide pin 208 is shown disposed within the piston 206 and the housing 200 and may be employed if desired.

The housing 200 is supported by a pair of studs 210, shown in FIGURE 13, each of which is slidably movable within a sleeve 212 shown in FIGURE 9 and is carried by a support member 214 shown in FIGURES 1 and 9. Attached to the housing 200 is a bracket 218, shown in FIGURE 9, which is similar to the arm 156 shown in FIGURES 4, 5, 6, and 12. The brake disc 102 of the rear wheel structure 32 is shown in FIGURE 9 and is engaged by brake shoes 220 and 222 carried by carrier plates 224 and 226 respectively. The carrier plates 224 and 226 are similar to the carrier plates 142 and 160 shown in FIGURE 12 and are provided with slots therein, not shown, to permit slight longitudinal movement thereof, as discussed above. The surface of the piston 206 which engages the carrier plate 226 is provided with suitable antifriction material as discussed above with respect to the surface 123 of the piston 120. Thus, fluid pressure applied through the conduit 168 and the passage 202 applies pressure upon the piston 206 which, in turn, applies braking forces to the brake disc 102.

However, braking pressure can also be applied to the disc 102 mechanically. A connector bolt 230 is threadedly connected to the piston 206, as shown in FIGURES 9, 10, and 11. The head of the bolt 230 provides an engagement portion for the piston 206. The head of the bolt 230 is engageable by a rotatable actuator 232 which has a cam portion 234. The actuator 232 also has a knurled end 236 which is attached to the arm 196 as shown in FIGURES 9 and 13. Rotative movement of the arm 196 causes rotative movement of the actuator 232 so that the cam portion 234 moves from the position thereof shown in FIGURE 11 to the position thereof shown in FIGURES 9 and 10. When the cam portion 234 is rotatively moved to the position thereof shown in FIGURES 9 and 10, the cam portion 234 engages the head of the bolt 230 and forces the piston 206 toward the disc 102 and applies a braking pressure upon the disc 102 through the brake shoes 220 and 223.

Rotative movement of the arm 196 is caused by rotative movement of the crank 188 through the link 192. Rotative movement of the crank 188 is effected by movement of the handle 185 which is connected to the crank 188 through the rod 187. Thus, movement of the handle 185 serves to operate the parking brake mechanism which is a part of the apparatus shown in FIGURES 9, 10, 11, and 13.

The cam portion 234 of the actuator 232 is provided with a pair of passages 245. When the cam portion 234 is rotatively positioned as shown in FIGURE 11, a tool, such as a socket wrench or the like, may be passed into the housing 200 after removal of a plug 247. The tool is then inserted through the passage 245 and into a socket 250 in the head of the bolt 230 for rotative movement of the bolt 230 for threaded adjustment thereof within the piston 206. Thus, the structure shown in FIGURES 9, 10, 11, and 13 is hydraulically operable and is also mechanically operable as a parking brake or the like.

Of course, it is to be understood that brake mechanism of FIGURES 9, 10, 11 and 13 may be associated with any of the wheel structures 32 of the trailer vehicle 28.

The apparatus of FIGURE 18

FIGURE 18 shows a modification of the valve mechanism illustrated in FIGURES 7, 8, 14, 15, 16, and 17 and may be substituted therefor. FIGURE 18 shows the conduits 90 and 86 connected to a housing 251. The conduit 90 communicates with a fluid passage 252. A ball 254 is used to close the fluid passage 252 to prevent flow of fluid into a bore 258. The ball 254 is urged in a direction from the passage 252 by a spring 255. The bore 258 is closed by a removable plug 260. A control member 262 is slidably movable within the bore 258 and has a body portion 264 engageable with the ball 254 for urging the ball 254 to close the passage 252. The control member 262 is operable by movement of a carrier plate, such as the carrier plate 142, in a manner discussed above.

The control member 262 also has a groove 266 into which the ball 254 may move, as shown in FIGURE 18, for opening the fluid conduit 252 for flow of fluid therefrom into the bore 258.

The conduit 86 is in communication with a fluid passage 270 within the housing 251. A ball 272 is adapted to close the passage 270. The ball 272 is urged in a direction from the passage 270 by a spring 274. The ball 272 is engageable with the body portion 264 of the control member 262, as shown, or the ball 272 may move into a groove 278 of the control member 262 when the control member 262 is moved to a position toward the plug 260.

Fluid may flow from the bore 258 into a passage 280 for operation of the brake mechanism of the wheel structures 32 of the trailer vehicle 28. The conduit 168 is shown joined to the housing 251 for flow of fluid therefrom in a manner discussed above with respect to the housing 106.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. Mechanism for hitching a trailer vehicle to a tow vehicle and for automatically braking the trailer vehicle, the trailer vehicle having wheel means comprising:
  body means including a fluid reservoir and a fluid cavity, and conduit means joining the fluid reservoir to the fluid cavity,
  a piston within the fluid cavity with a piston rod extending from the piston and from the fluid cavity,
  means for connecting the piston rod to one of the vehicles,
  means for connecting the body means to the other vehicle,
  fluid valve means,
  the wheel means of the trailer vehicle having fluid operable brake means,
  fluid conduit means joining the fluid cavity to the fluid valve means,
  fluid conduit means joining the fluid valve means to the brake means of the wheel means,
  sensing means operably joined to the wheel means for sensing the direction of rotation of the wheel means,
  means responsive to the sensing means for operation of the fluid valve means with change in direction of rotation of the wheel means.

2. Hitch and brake mechanism for a trailer vehicle provided with wheel structure and having fluid operable brake means for braking the wheel structure comprising:
  fluid reservoir means,
  fluid chamber means,
  hitch means joined to one of said means, the hitch means being adapted to be attached to a tow vehicle,
  fluid conduit means joining the fluid reservoir means to the fluid chamber means, the fluid conduit means communicating with the fluid chamber means at spaced-apart positions thereof, the fluid conduit means having check-valve means therein permitting flow of fluid from the fluid reservoir means to the fluid chamber means,
  piston means movably disposed within the fluid chamber means and normally positioned intermediate the positions of communication of the fluid conduit means with the fluid chamber means,
  fluid conductor means joining the fluid reservoir means to the fluid chamber means,
  the fluid conductor means communicating with the fluid chamber means intermediate the positions of communication of the fluid conduit means with the fluid chamber means,
  fluid control valve means,
  fluid line means in communication with the fluid chamber means at spaced-apart portions thereof, the fluid line means also being in communication with the fluid control valve means,
  fluid conduct means joining the fluid control valve means to the fluid operable brake means of the trailer vehicle,
  sensing means responsive to rotative movement of the wheel structure for operation thereby with changes in direction of rotative movement of the wheel structure,
  means joining the sensing means to the fluid control valve means for operation of the fluid control valve means by the sensing means.

3. Hitch and brake mechanism for a trailer vehicle provided with at least one wheel member and having fluid operable brake means operable thereupon for braking thereof comprising:
  fluid reservoir means,
  fluid chamber means,
  fluid conduit means, the fluid conduit means being in communication with the fluid chamber means at spaced-apart portions thereof, the fluid conduit means also being in communication with the fluid reservoir means,
  check-valve means within the fluid conduit means and limiting flow of fluid to movement in a direction from the fluid reservoir means to the fluid chamber means,
  a piston within the fluid chamber means and relatively movable with respect thereto, the piston being normally positioned intermediate said spaced-apart positions of the fluid chamber means at which the fluid passage means are in communication with the fluid chamber means,
  fluid conductor means communicating with the fluid chamber means intermediate the said positions of communication of the fluid passage means with the fluid chamber means,
  a pair of fluid lines joined to the fluid chamber means at spaced-apart positions thereof,
  a fluid flow control valve member,
  the fluid lines being joined to the fluid flow control valve member for flow of fluid between the fluid chamber means and the valve member,
  fluid conductor means in communication with the fluid flow valve member and also in communication with the fluid operable brake means of the trailer vehicle,
  detector means operably joined to a wheel member of the trailer vehicle for sensing the direction of rotative movement thereof,
  means operably joining the detector means to the fluid flow control valve member for operation thereof,
  the fluid flow control valve member thus being controlled by the operation of the detector means for controlling flow of fluid from the fluid reservoir means to the brake means in accordance with the direction of rotative movement of a wheel member of the trailer vehicle.

4. In combination with trailer vehicle hitch apparatus comprising:
  a fluid reservoir member,
  a fluid chamber member having a fluid chamber,
  a piston within the fluid chamber of the fluid chamber member, the piston being movable with respect to the fluid chamber member,
  a piston rod connected to the piston and extending from the fluid chamber member,
  a plurality of unidirectional fluid conduit members joining the fluid reservoir member to the fluid chamber member, the fluid conduit members being in communication with the chamber of the fluid chamber member at spaced-apart portions thereof, the unidirectional fluid conduit members permitting flow of fluid therethrough from the fluid reservoir member to the chamber of the fluid chamber member,
  fluid flow control valve mechanism,
  brake means carried by the trailer vehicle for braking thereof,
  a plurality of fluid lines, there being fluid lines joined to the fluid chamber member and in communication with the fluid chamber at spaced-apart portions thereof, the fluid lines also being joined to the fluid flow control valve mechanism, there being fluid lines joining the fluid flow control valve mechanism to the brake means,
sensing means sensing the direction of movement of the trailer vehicle, the sensing apparatus being operably connected to the fluid flow control valve mechanism for opeartion thereof with change in direction of movement of the trailer vehicle.

5. Hitch and brake apparatus for a trailer vehicle provided with at least one wheel member, comprising:
a fluid reservoir member,
a fluid chamber member having a fluid chamber,
fluid conduit means joining the fluid reservoir member to the fluid chamber member, the fluid conduit means being in communication with the fluid chamber of the chamber member at spaced-apart portions of the fluid chamber,
check-valve means within the fluid conduit means permitting flow of fluid therein from the fluid reservoir member to the chamber of the fluid chamber member,
fluid conductor means in communication with the fluid reservoir member and with the chamber of the fluid chamber member, the fluid conductor means being in communication with the fluid chamber of the chamber member intermediate the positions of communication of the fluid conduit members with the fluid chamber,
a piston member axially movable within the fluid chamber of the fluid housing member,
fluid flow control valve means,
a plurality of fluid lines in communication with the fluid chamber of the housing member at spaced-apart portions of the fluid chamber, the fluid lines also being in communication with the fluid valve means,
an annular brake disc rotatable with a wheel member of the trailer vehicle,
brake pad means engageable with the annular brake disc for braking the wheel member,
support means supporting the brake pad means and mounted for limited movement in the direction of rotation of the annular brake disc while the brake pad means is in engagement with the annular brake disc,
means operably connecting the support means to the fluid flow control valve means for operation of the fluid flow control valve means with movement of the support means,
a fluid operable plunger operable upon the support means to force engagement of the brake pad means with the annular brake disc for braking the wheel member,
fluid conduit means joining the fluid flow control valve means to the fluid operable plunger for operation of the plunger by fluid controlled by the fluid flow control valve means.

6. Apparatus for moving a vehicle in either a forward or reverse direction of movement and for braking the vehicle in either a forward or reverse direction of movement, the vehicle having at least one wheel structure comprising:
a bracket member carried by the vehicle,
a lever member having an end portion pivotally attached to the bracket,
a tow bar pivotally attached to the other end portion of the lever member,
a fluid housing pivotally carried by the vehicle, the fluid housing being provided with a fluid chamber,
a piston member axially movable within the fluid chamber and having a piston rod extending therefrom, the piston rod being pivotally connected to the lever member intermediate the ends thereof,
a fluid flow control valve member,
fluid conduit means joining the fluid flow control valve member to the housing, the fluid conduit means being in communication with the chamber of the housing at spaced-apart portions thereof,
brake means operably connected to the wheel structure for braking thereof,
sensing means disposed adjacent the wheel structure and operably sensing the direction of rotation thereof,
means operably joining the sensing means to the fluid flow control valve member of operation thereof by the sensing means.

7. The combination of apparatus for connecting a trailer vehicle to a tow vehicle and brake apparatus for the trailer vehicle, the trailer vehicle being provided with wheel structure comprising:
a housing member carried by the trailer vehicle, the housing member having a fluid chamber and a fluid reservoir with fluid conduit means joining the fluid reservoir to the fluid chamber at spaced-apart portions thereof,
a piston member within the fluid chamber and having a piston rod extending therefrom,
means for operably connecting the piston rod to a tow vehicle,
fluid motor means,
a plurality of fluid conductor members joining the fluid chamber to the fluid motor means,
valve means within the fluid conductor means and controlling flow of fluid between the fluid chamber and the fluid motor means,
the wheel structure including brake mechanism for braking thereof,
means joining the fluid motor means to the brake mechanism for operation of the brake mechanism by the fluid motor means,
sensing means operably joined to the wheel structure for sensing the direction of rotative movement thereof,
and means joining the sensing means to the valve means for operation of the valve means by the sensing means.

8. Mechanism for connecting a trailer vehicle to a tow vehicle and for automatically braking the trailer vehicle by change in the rate of movement of the tow vehicle with respect to the rate of movement of the trailer vehicle comprising:
a hitch device including a tow bar, one end of the tow bar being attachable to a tow vehicle,
a level member having an end portion attached to the other end of the tow bar,
support structure carried by the trailer vehicle, the other end of the lever member being attached to the support structure,
a fluid chamber member pivotally carried by the support structure,
a piston member slidably movable within the fluid chamber and having a piston rod extending from the fluid chamber member, the piston rod being pivotally attached to the lever member intermediate the ends thereof,
the trailer vehicle having wheel means and brake means, the brake means being operable upon the wheel means for braking the wheel means,
fluid conductor means joining the fluid chamber member to the brake means for fluid operation of the brake means,
valve means within the fluid conductor means for controlling flow of fluid therethrough,
sensing means adjacent the wheel means and operably movable in the direction of rotation of the wheel means,
means operatively joining the sensing means to the valve means for operation of the valve means with movement of the sensing means.

9. Mechanism for connecting a trailer vehicle to a tow vehicle and for automatically braking the trailer vehicle with change in the rate of movement of the tow vehicle with respect to the rate of movement of the trailer vehicle comprising:

a hitch device including a tow bar, one end of the tow bar being attachable to a tow vehicle, a lever member, the other end of the tow bar being attached to one end of the lever member, support structure carried by the trailer vehicle, the other end of the lever member being pivotally attached to the support structure, a fluid reservoir and fluid chamber unit pivotally carried by the support structure, a piston member slidably movable within the fluid chamber of the unit and having a piston rod extending from the fluid chamber and pivotally attached to the lever member intermediate the ends thereof, fluid conduit means in communication with the fluid reservoir and with the fluid chamber, the trailer vehicle having wheel means and brake means, the brake means being operable upon the wheel means for braking the wheel means, the brake means being supported for limited movement in the direction of rotative movement of the wheel means, fluid conductor means joining the fluid chamber of the unit to the brake means for fluid operation of the brake means, valve means within the fluid conductor means for controlling flow of fluid therethrough, sensing means operatively joined to the brake means and operable with movement of the brake means to indicate direction of rotation of the wheel means, means operatively joining the sensing means to the valve means for operation of the valve means with operation of the sensing means.

10. Apparatus for automatically braking a trailer vehicle during movement thereof by a tow vehicle in a forward direction or in a reverse direction, the trailer vehicle being provided with wheel structure having at least one braking disc carried by the wheel structure and rotatable therewith, the braking disc being provided with a pair of substantially parallel side surfaces comrotatable therewith, the braking disc being provided comprising:

a master fluid cylinder member provided with a piston member, means for connection of one of the said members to the trailer vehicle and for connection of the other of said members to a tow vehicle, a housing disposed adjacent the braking disc of the wheel structure of the trailer vehicle, the braking disc having a first side surface and a second side surface, the housing being mounted adjacent the first side surface of the braking disc for movement toward and away from the first side surface of the braking disc, the housing having a cavity therein adjacent the first side surface of the braking disc, an arm rigidly carried by the housing and having a portion adjacent the second side surface of the braking disc, a piston within the cavity of the housing, fluid conduit means in communication with the master fluid cylinder member and in communication with the cavity of the housing for fluid operation of the piston within the cavity of the housing, fluid valve means within the fluid conduit means between the master fluid cylinder member and the cavity of the housing and operable to control flow of fluid within the fluid conduit means, a carrier member adjacent the housing, the carrier member having a slot therein, the housing having a protuberance within the slot so that the carrier member has limited movement in a direction substantially parallel to the first side surface of the braking disc, the carrier member being engageable by the piston for urging movement of the carrier member toward the first side surface of the braking disc, a brake pad attached to the carrier member and engageable with the first side surface of the braking disc, a carrier member adjacent the second side surface of the braking disc, the carrier member having a slot therein, the arm having a protuberance disposed within the slot of the carrier member so that the carrier member has limited movement in a direction substantially parallel to the second side surface of the disc, an engagement member attached to the last said carrier member and engageable with the second side surface of the braking disc, means joining at least one of the carrier members to the fluid valve means for operation thereof with movement of the carrier member.

11. In brake apparatus for wheel structure, the wheel structure having brake surface means, support structure adjacent the wheel structure and in supporting relationship thereto so that the wheel structure is rotatively movable with respect to the support structure, engagement means adjacent the brake surface means and engageable therewith for braking the wheel structure, carrier means supporting the engagement means, the carrier means being supported by the support structure for limited movement so that the wheel structure is rotatively movable through a limited degree while the engagement means are in engagement with the brake surface means of the wheel structure, fluid operable actuator means for urging movement of the carrier means toward the brake surface means of the wheel structure for engagement of the engagement means with the brake surface means for braking the wheel structure, control means operably connected to the carrier means for operation thereby upon movement thereof, fluid valve means leading to the fluid operable actuator means for controlling flow of fluid thereto, means operably connecting the control means to the fluid valve means so that operation of the control means controls flow of fluid through the valve means to the fluid operable actuator means.

12. Apparatus of the type described comprising:

a trailer vehicle, a fluid housing carried by the trailer vehicle, a turning plate carried by the trailer vehicle adjacent the fluid housing, a yoke having an end portion pivotally attached to the turning plate, the yoke also having an opposite end portion, a tow bar pivotally connected to said opposite end portion of the yoke, a piston within the fluid housing and having a piston rod extending therefrom and attached to the yoke intermediate the end portions thereof, the trailer vehicle having support wheel structure for movement thereof, the wheel structure being provided with fluid operable brake means, fluid conduit means in communication with the fluid housing and with the fluid operable brake means, fluid control means within the conduit means for controlling flow of fluid between the fluid housing and the fluid operable brake means, sensing means adjacent the wheel structure and sensing the direction of rotative movement thereof, means operably joining the sensing means to the fluid control means for operation thereof.

13. Apparatus of the type described comprising:

a trailer vehicle, hitch means carried by the trailer vehicle for connection of the trailer vehicle to a tow vehicle, fluid actuator means carried by the trailer vehicle adjacent the hitch means, means carried by the trailer vehicle joining the fluid actuator means to the hitch means for operation thereby, fluid operable brake means carried by the trailer vehicle for braking thereof, fluid conductor means joining the fluid actuator means to the fluid operable brake means for flow of fluid therebetween, sensing means carried by the trailer vehicle and operable upon movement of the trailer vehicle to sense the direction of movement thereof, fluid control means within the fluid conductor means and responsive to the sensing means for operation thereby.

14. Apparatus of the type described comprising:

a trailer vehicle movable forwardly or rearwardly, hitch means carried by the trailer vehicle for connection of the trailer vehicle to a tow vehicle for movement of the trailer vehicle forwardly or rearwardly, actuator means carried by the trailer vehicle, means joining the actuator means to the hitch means for operation thereby when there is relative movement between the tow vehicle and the trailer vehicle in either direction of movement of the trailer vehicle, brake means carried by the trailer vehicle for braking thereof, intermediate means carried by the trailer vehicle and joining the actuator means to the brake means for operation of the brake means by the actuator means, sensing means carried by the trailer vehicle and operable upon movement of the trailer vehicle to sense the direction of movement thereof, control means carried by the trailer vehicle and operably joined to the intermediate means and to the sensing means for operation of the control means by the sensing means.

15. Apparatus of the type described comprising:

a trailer vehicle, hitch means carried by the trailer vehicle for connection thereof to a tow vehicle, the hitch means being operable in response to a change in the position of the trailer vehicle with respect to the position of the tow vehicle, brake means carried by the trailer vehicle for braking thereof, brake operator means carried by the trailer vehicle and operably connected to the hitch means and to the brake means, the brake operator means including sensing means operable upon movement of the trailer vehicle to sense the direction of movement of the trailer vehicle, the brake operator means operating the brake means in accordance with the direction of movement of the trailer vehicle and in response to operation of the hitch means.

16. Apparatus of the type described comprising:

hitch means for connection of a trailer vehicle to a tow vehicle, fluid actuator means carried by the trailer vehicle adjacent the hitch means and operably joined thereto for operation thereby, the trailer vehicle being provided with rotatable support wheel structure, the wheel structure including a member having a brake surface, fluid operable brake means carried by the trailer vehicle adjacent the wheel structure, the brake means including pressure means engageable with the brake surface for braking of the wheel structure, the pressure means having limited movement in the direction of rotative movement of the wheel structure while the pressure means is in engagement with the brake surface of the wheel structure, fluid conductor means joining the fluid actuator means to the fluid operable brake means for flow of fluid therebetween, fluid control means within the fluid conductor means for control of fluid flow between the fluid actuator means and the fluid operable brake means, and means operably connecting the pressure means to the fluid control means for operation thereof with movement of the pressure means.

17. Apparatus of the type described comprising:

a trailer vehicle provided with wheel structure and fluid operable braking means therefor, the trailer vehicle being movable forwardly or rearwardly as the wheel structure rotates forwardly or rearwardly, hitch means caried by the trailer vehicle for attachment to a tow vehicle, a master fluid braking cylinder member carried by the trailer vehicle adjacent the hitch means and connected thereto for operation thereby, fluid conduit means joining the fluid braking cylinder member to the fluid operable braking means, fluid control means within the fluid conduit means and operable to control flow of fluid between the master fluid braking cylinder member and the fluid braking means, sensing means carried by the trailer vehicle and operably connected to the wheel structure sensing the direction of rotation thereof, and means carried by the trailer vehicle and operably joining the sensing means to the fluid control means for operation thereof in accordance with the direction of movement of the trailer vehicle.

18. Hitch and brake mechanism for a trailer vehicle which is adapted to be towed by tow means, the trailer vehicle being provided with wheel means, the wheel means being rotatively operated in either a forward direction or in a reverse direction comprising:

fluid reservoir means, fluid chamber means, fluid conduit means joining the fluid reservoir means to the fluid chamber means, piston means within the fluid chamber means, means for joining the piston means to tow means, fluid valve means, the wheel means having fluid braking means, conduit means joining the fluid chamber means to the fluid valve means, conduit means joining the fluid valve means to the fluid braking means, sensing means operably joined to the wheel means and operable with rotative movement thereof for sensing the direction of rotation of the wheel means, the sensing means thus sensing whether the wheel means is being rotatively operated in the forward direction or in the reverse direction, means operably joining the sensing means to the fluid valve means for operation of the fluid valve means by the sensing means, the piston means being operated by relative movement between the trailer vehicle and tow means in either direction of rotative movement of the wheel means, operation of the piston means causing flow of fluid between the fluid chamber means and the fluid valve means.

19. In apparatus for automatically braking a vehicle in a forward direction of movement and in a reverse direction of movement, the vehicle being adapted to be moved by tow means, the vehicle having wheel means operable in a forward direction of rotation and operable in a reverse direction of rotation, brake means carried by the vehicle and operable upon the wheel means for braking thereof, sensing means carried by the vehicle, the sensing means being operably connected to the wheel means and sensing the direction of rotation thereof, the sensing means being operable with change of direction of rotation of the wheel means from forward direction to reverse direction and from reverse direction to forward direction, control means responsive to operation of the sensing means for controlling operation of the brake means, means for sensing movement of the vehicle with respect to tow means and operably joined to the control means for operation of the brake means in response to operation of the sensing means and in accordance with movement of the vehicle with respect to tow means.

20. Brake mechanism for a trailer vehicle connectable to a tow vehicle for movement of the trailer vehicle in the forward direction of movement and in the rearward direction of movement comprising:
 brake means carried by the trailer vehicle for braking thereof in the forward direction of movement and in the rearward direction of movement,
 brake operator means carried by the trailer vehicle and operably connected to the brake means for operation thereof,
 the brake operator means including sensing means which senses movement of the trailer vehicle in the forward direction of movement and which senses movement of the trailer vehicle in the reverse direction of movement, the brake operator means operating the brake means in response to reduction in the rate of movement of the tow vehicle with respect to the rate of movement of the trailer vehicle and in accordance with the direction of movement of the trailer vehicle with respect to the direction of movement of the tow vehicle.

References Cited

UNITED STATES PATENTS

| 1,838,131 | 12/1931 | Bendix et al. |
| 2,120,917 | 6/1938 | Hause. |
| 3,216,532 | 11/1965 | Erickson et al. |

DUANE A. REGER, *Primary Examiner.*